United States Patent [19]
Björnson

[11] 4,162,053
[45] Jul. 24, 1979

[54] BRAKE DEVICE FOR ROTATING BODY

[75] Inventor: Björn O. Björnson, Karlskoga, Sweden

[73] Assignee: AB Bofors, Bofors, Sweden

[21] Appl. No.: 855,140

[22] Filed: Nov. 28, 1977

[30] Foreign Application Priority Data

Dec. 27, 1976 [SE] Sweden .................................. 7614551

[51] Int. Cl.² ............................................ B64D 19/02
[52] U.S. Cl. .................................. 244/3.27; 102/37.1; 244/113; 244/138 A; 416/DIG. 3; 416/88; 188/270
[58] Field of Search ............ 244/137 R, 138 R, 138 A, 244/3.27, 110 D, 111, 113; 416/2, 142, DIG. 3, 87, 88, 132 A; 102/4, 34.1, 35.4, 37.1; 188/270, 184; 415/9

[56] References Cited

U.S. PATENT DOCUMENTS

| | | | |
|---|---|---|---|
| 2,064,845 | 12/1936 | Moray et al. | 416/DIG. 3 |
| 2,918,235 | 12/1959 | Aberg et al. | 102/4 |
| 3,115,831 | 12/1963 | Suter | 244/138 A |
| 3,189,982 | 6/1965 | Merz | 416/DIG. 3 |
| 3,273,834 | 9/1966 | Bower | 244/138 A |
| 3,730,099 | 5/1973 | Schopp | 244/138 R |

Primary Examiner—Galen L. Barefoot
Attorney, Agent, or Firm—Pollock, Vande Sande & Priddy

[57] ABSTRACT

A brake device for retarding linear and rotative movement of a load carrying unit after ejection from an in-flight projectile, wherein a container encloses the unit and includes a plurality of slits which divide the container into sections. Each section includes a concave end portion which pivots into a position for retarding movement of the unit responsive to movement of the container through the atmosphere.

8 Claims, 2 Drawing Figures

BRAKE DEVICE FOR ROTATING BODY

BACKGROUND OF THE INVENTION

The present invention relates to a device utilizing centrifugal and air forces for braking a rotating body that can be ejected into the air. The body is then assumed to comprise a load-carrying unit and an open container provided with slits.

The body in question is primarily of the kind that can be fired into the air by means of a projectile, shell, etc., which at the firing is given a stabilizing rotation, with the body being arranged in a known way to be ejected from the projectile, shell etc. at a predetermined point in the ballistic trajectory. As further examples the body may include a unit with a charge for illumination, for laying of smoke screens, mine-laying, etc. wherein it is essential that the load, after having been ejected from the projectile, shell, etc. can be rapidly braked as regards both the linear velocity and the rotation.

For bodies of the type which are ejected into the air, it is known to utilize for instance brake flaps arranged at the envelope surface of the container for braking the rotation. With such flaps it is necessary, particularly at high rotating speeds of the ammunition in question, to have comparatively stable fastening and supporting members, which requires the container to be comparatively heavily dimensioned. This, in turn, takes up a substantial portion of the space in the shell, with a comparatively heavy shell assembly as a result thereof.

OBJECT AND SUMMARY OF THE PRESENT INVENTION

The present invention is concerned with solving problems facing known assemblies, and proposes a technically simple arrangement according to which the space in the shell can be optimally utilized to provide an effective load, while providing at the same time a comparatively light design can be obtained.

A distinctive feature of a brake device formed according to the present invention is that the container is fastened to the unit at fastening points with the slits in the container arranged so that side parts of the container, under the influence of centrifugal and air forces, are turnable in non-slitted material at the fastening points; but with continued unity via material in the bottom part of the container to turned-out positions where the surfaces of the side parts form braking surfaces.

The present invention provides, not only effective braking of the rotation, but also a considerable reduction in the velocity. However, the device according to the present invention can also be used for a parachute-borne charge, where the linear velocity is slowed down for instance by means of a special brake parachute and-/or a main parachute, with which the charge is intended to be allowed to descend towards an area on the ground which is of particular interest when using illuminating ammunition. The invention is also applicable for mine-laying from a projectile or shell, in which case one or a plurality of part charges are ejected from the projectile, shell, etc. at one or several points in the ballistic trajectory.

BRIEF DESCRIPTION OF THE DRAWINGS

A preferred embodiment of the present invention will be described in detail hereafter, with reference to the accompanying drawings, in which.

DETAILED DESCRIPTION OF A PREFERRED EMBODIMENT

Figure 1:
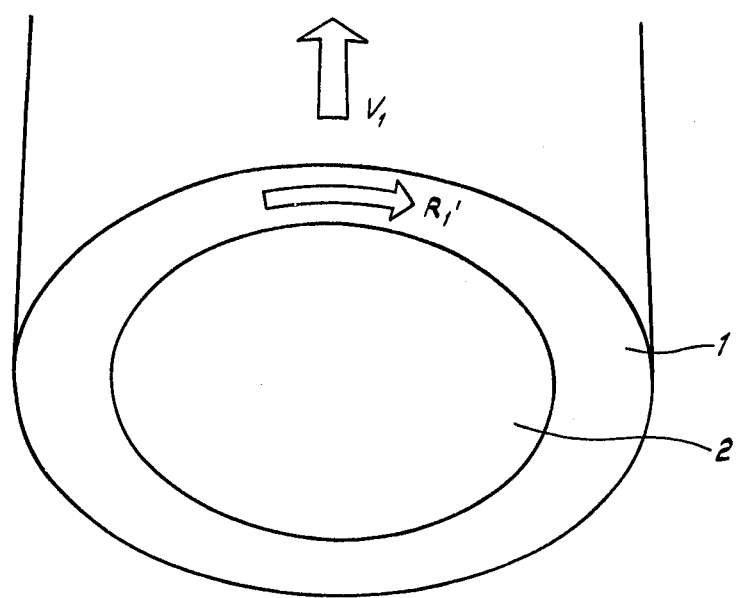
FIG. 1 shows a view in perspective and viewed obliquely from the rear of a body assembly in a first stage comprising an open container and a load-carrying unit enclosed in the same, ejected from a projectile.
Figure 1:
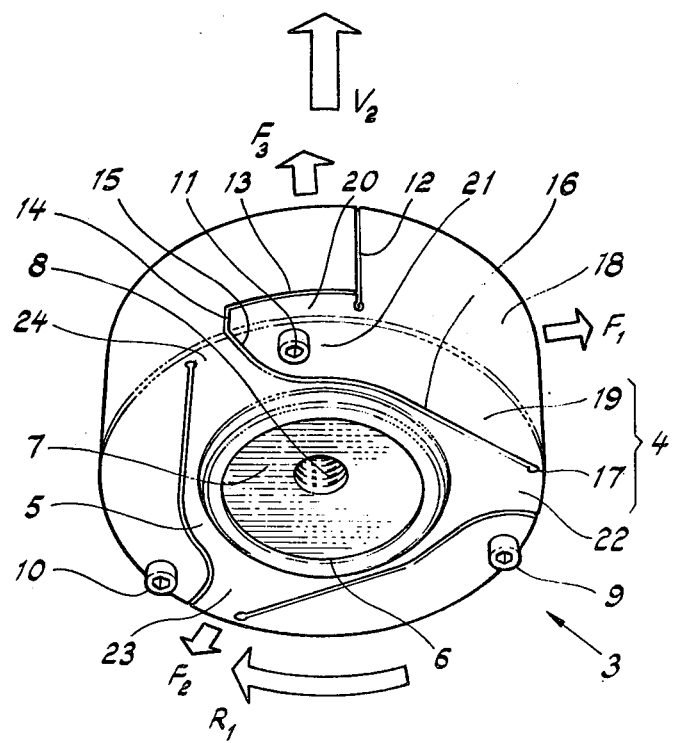
Figure 2:
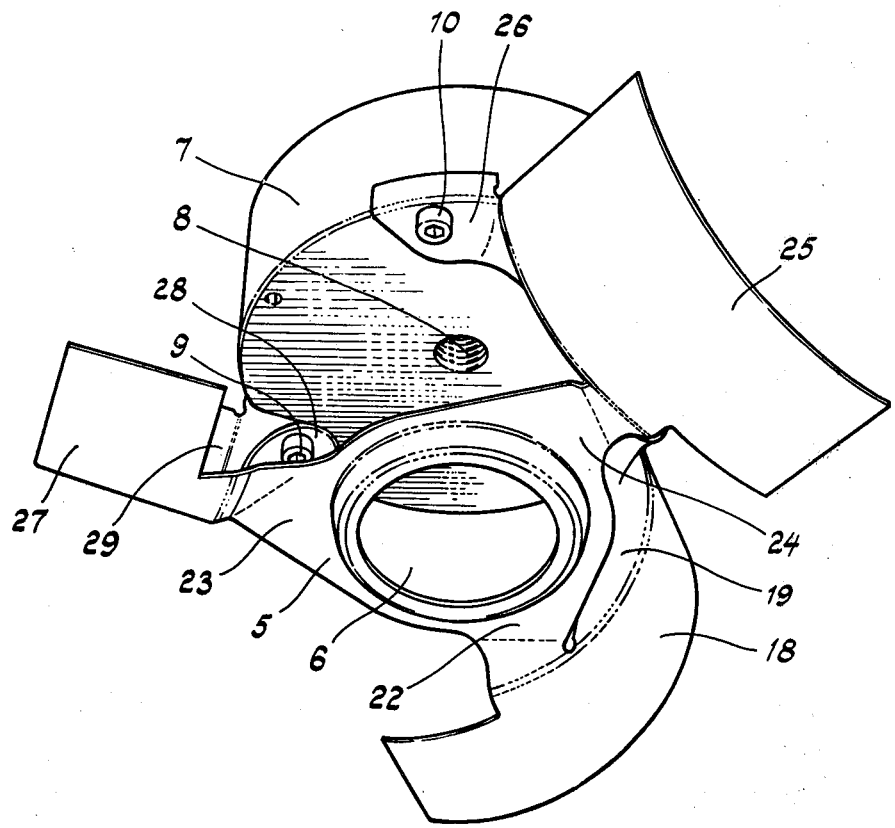
FIG. 2 shows a view in perspective and viewed obliquely from above of the body assembly formed according to FIG. 1 in a second stage.

The embodiment shown in FIGS. 1 and 2 is intended to illustrate a body 3 ejected from a space 2 existing in a rotating shell, projectile etc. indicated generally at 1. The shell 1 or the like is of the kind which may comprise a space 2 for one or a plurality of bodies 3, which can be conventionally ejected from the fired unit at one or several predetermined points in the ballistic trajectory thereof.

FIG. 1 is intended to illustrate the case where the body 1 has just been ejected from the shell 1, with shell 1 continuing in its trajectory in the direction indicated by a velocity arrow $V_1$. While the body 3 has then been retarded in relation to movement of shell 1, the body continues in substantially the same direction as the shell, as indicated by a velocity arrow $V_2$. Assuming for example that $V_1$ at the ejection is approx. 500 m/s, it may be assumed in the present case that $V_2$ is approx. 450 m/s. The shell 1 is, moreover, of the type which has been given a rotation when fired from a barrel, not shown for purposes of clarity. Therefore, the body 3 is rotating around its longitudinal axis at ejection, which is indicated by the rotation arrow $R_1$ in FIG. 1. The rotation of shell 1 is shown by the rotation arrow $R_1'$ and the rotating speed of the shell and the body is approximately the same at the instant of the ejection.

The body 3, ejected from the shell and rotating around its longitudinal axis, comprises a cylindrical, open container, which is made in the form of a straight cylindrical part 4 and a bottom part 5 connected thereto. The bottom part 5 is made with a recess 6 and body 3 also comprises a load-carrying unit which is enclosed in the container so that the envelope surface extends down along the outside of the load-carrying unit. In the present case, the load-carrying unit consists of a mine charge which is made with a recess 8 for members, not shown, which prepare the charge for activation at the ejection from the shell in a conventional and known manner.

The container is slitted and fastened to the load-carrying unit at fastening points which in the figure have been indicated by three fastening screws 9, 10 and 11. The fastening of the container to the load-carrying unit is accomplished via the bottom part 5 of the container, which is thus provided with through holes, not shown, for screws, and which are uniformly distributed along the periphery of the bottom part, so that the container can be screwed to the load-carrying unit 7 via the bottom part 5.

The arrangement of slits on the container includes three identically formed slits, with each slit including a first part 12 extending in the longitudinal direction of the cylindrical part 4. In particular, each first part 12 extends along the major portion of the longitudinal extent of the cylindrical part 4. The slit part 12 thus extends from the open end of the container and nearly all the way to the bottom part. Connected to the first slit part 12, at a short distance from the section where it ends near the bottom part is a second slit part 13 which extends substantially at right angles in relation to the first slit part 12 and peripherally along the cylindrical part 4 of the container. The second slit part 13 is connected to a third slit part 14 which extends parallel to the longitudinal direction of the first slit part 12 to the bottom part 5, where it goes over into a curved, fourth slit part 15 formed in the bottom part 5. The curved, fourth slit part 15 goes over into a substantially straight, fifth slit part 16 which from the fourth slit part 15 extends obliquely outwardly towards the periphery of the bottom part ending at a point 17.

The three slits, consisting of the plurality of slit parts, are uniformly distributed along the periphery of the container. Three identical container parts are thereby formed, each of which comprises a section 18 which extends along approx. ⅓ of the periphery of the container, a peripheral section 19 of the bottom part of the container, and a flap-shaped fastening section, directed rearwards, which comprises a small first section 20 on the cylindrical part of the container and also a second section 21 on the bottom part of the container. The three identical container parts are held together by the bottom part 5 via sections 22, 23 and 24 of material. During ejection of the rotating body 3, centrifugal and air forces act upon the three identical container parts. The centrifugal forces are shown by three force arrows $F_1$, $F_2$ and $F_3$. The centrifugal and air forces strive to force the identical side parts outwards to the turned-out positions shown in FIG. 2. In FIG. 2, body 3 is viewed obliquely from above. The body is assumed to lose further speed so that, in principle, it leaves the ballistic trajectory of the shell and turns the unit downwards, towards a ground surface not shown.

Each one of the identical container parts turns under the influence of said centrifugal and air forces in non-slitted material at the fastening parts 20, 21. In FIG. 2 the non-slitted material for the side part with the section 25 is shown by the numeral 26 at the fastening point 10, while the non-slitted section for the side part with the section 27 is shown by 28 at the fastening point 9. The non-slitted section for the side part with the section 18 is not shown in FIG. 2.

The sections 18, 25 and 27 of the identical container parts thus turn outwards in the non-slitted sections to the positions shown in FIG. 2 where they are still held together at their middle parts by means of the material 22, 23 and 24 in the bottom part of the container.

The sections 18, 25 and 27 with the peripheral sections belonging to them on the bottom part of the container, of which only the peripheral section 19 is shown clearly in FIG. 2, form blades in the curved-out position with their concave surfaces 29 form braking surfaces. During the turning-out of the identical container parts, the bottom part 5 on the container and the load-carrying unit 7 execute a relative turning movement between them while the distance between the bottom part 5 and the corresponding surface of the load-carrying unit 7 is increased. In this way, the three identical container parts, in addition to their outwardly turning movements are capable of carrying out travelling movements in relation to a plane coinciding with corresponding surface of the load-carrying unit. Sections 22, 23 and 24 in connection with the material in the bottom part of the container continue to hold the identical parts together from the movements from the position according to FIG. 1 to the position according to FIG. 2. The respective parts of the sections 18, 25 and 26 have a uniform width along their entire longitudinal extent, with the exception of the upper part, which is reduced by an area corresponding to the area for section 20. In the present case, the blade-shaped braking surfaces extend substantially at right angles out from the load-carrying unit 7. The recess 6 permits activation or initiation of the charge via the recess by the expulsion gases and/or forces in the shell. Through recess 6, cords, not shown, for a parachute can extend down to fastening devices not shown at the charge and/or the container.

In the preferred embodiment described above, the container is made of steel plate with a thickness of approx. 1.0 mm. The open container has a diameter of approx. 120 mm while the length of the cylindrical part 4 is approx. 50 mm. The first part of the slit is approx. 48 mm, the second part of the slit approx. 35 mm, and the third part of the slit approx. 10 mm. The curved, fourth part of the slit has a radius from the fastening hole in question in the container of approx. 15 mm, and from the centre of the container of approx. 39 mm. The fifth, straight slit part 16 has a length of approx. 60 mm, and its end 17 is located 2-3 mm from the periphery of the bottom part. The width of the slits is approx. 1-2 mm. The spacing between the fastening points 9, 10 and 11 is 120°, resulting in three identically-shaped container parts. The device described above is intended to function at centrifugal and air forces occurring at rotating speeds of approx. 5800 r.p.m. The device described above also functions as a brake on the velocity, and the number of identical parts can be chosen from two or more, in dependence on inter alia the height of the flaps. Preferably, the number of identical container parts chosen should be two, three or four. In the example of the embodiment shown, considerable braking is obtained from both a linear and rotational point of view.

The invention is not limited to the embodiment shown above as an example, but can be subject to modifications within the scope of the accompanying claims.

I claim:

1. Braking assembly for retarding linear and rotative movement of a load carrying unit after ejection of the unit from an in-flight projectile, shell or the like, said braking assembly comprising:
   a cylindrically-shaped hollow container surrounding said load carrying unit, said container having a closed end portion positioned adjacent an end portion of said unit;
   a plurality of fasteners spaced about the periphery of said closed end portion of said container, said fasteners fixedly joining said adjacent end portions to one another;
   slit means extending through portions of said cylindrically shaped container and closed end portion for dividing said container into a plurality of sections, each said section having a substantially concave end portion extending circumferentially about a portion of said load carrying unit;
   whereby each of said concave end portions pivots away from said unit to form a blade-like member having a concave brake surface functioning to retard both the linear and rotative movement of said carrying unit and attached container.

2. A braking assembly according to claim 1, wherein an aperture extends through a substantially centrally disposed portion of said closed end of said container.

3. A braking device according to claim 1, wherein at least three fasteners are positioned at equal angular intervals about the periphery of said closed end of said container, each of said fasteners joining said container to said load carrying unit.

4. A braking device according to claim 1, wherein said slit means comprises at least three separate slits each extending through said cylindrically shaped container and said closed end portion attached thereto.

5. A braking device according to claim 4, wherein each of said slits includes a first slit portion extending from an open end of said container longitudinally toward said closed end portion;

each of said slits includes a second slit portion extending from said respective first portions circumferentially about a portion of said container with a flanged end portion of said second slit portion extending into contact with said closed end of said container;

each of said slits further includes a third slit portion which curves through a portion of said closed end of said container and joins said flanged end portion;

and each of said slits further includes a fourth slit portion which extends in a substantially straight line through said closed end portion of said container and which joins an end of said third slit portion.

6. A braking device according to claim 4, wherein each section formed by said slits is attached to said load carrying unit via a separate fastener assembly.

7. A braking device according to claim 4, wherein each of said slits forms a flap-shaped fastening part extending between said concave end portion and said closed end portion of said container to allow said concave end portion to pivot away from said load carrying unit to provide a brake against linear and rotative movement of said unit.

8. A braking device according to claim 1, wherein at least two and not more than four sections are formed by said slit means.

* * * * *